(12) United States Patent
Purcell et al.

(10) Patent No.: US 6,389,555 B2
(45) Date of Patent: May 14, 2002

(54) SYSTEM AND METHOD FOR FAIL-OVER DATA TRANSPORT

(75) Inventors: Brian T. Purcell; Jay C. Brinkmeyer, both of Tomball, TX (US)

(73) Assignee: Compaq Information Technologies Group, L.P., Houston, TX (US)

(*) Notice: Subject to any disclaimer, the term of this patent is extended or adjusted under 35 U.S.C. 154(b) by 0 days.

(21) Appl. No.: 09/840,671

(22) Filed: Apr. 23, 2001

Related U.S. Application Data

(63) Continuation of application No. 09/075,623, filed on May 11, 1998.

(51) Int. Cl.[7] .............................................. G06F 11/00
(52) U.S. Cl. ......................................... 714/10; 709/242
(58) Field of Search ............................... 714/10, 2, 4, 6, 714/8, 9, 13, 25, 31, 41, 43, 56; 709/203, 220, 221, 242

(56) References Cited

U.S. PATENT DOCUMENTS

| | | | |
|---|---|---|---|
| 4,914,653 A | 4/1990 | Bishop et al. | 370/85.6 |
| 5,072,368 A * | 12/1991 | Foreman et al. | 395/575 |
| 5,333,314 A * | 7/1994 | Masai et al. | 395/600 |
| 5,359,594 A | 10/1994 | Gould et al. | 370/24 |
| 5,475,813 A * | 12/1995 | Cieslak et al. | 395/182.02 |
| 5,592,476 A | 1/1997 | Calamvokis et al. | 370/390 |
| 5,699,511 A | 12/1997 | Porcaro et al. | 395/185.08 |
| 5,784,547 A * | 7/1998 | Dittmar et al. | 395/182.02 |
| 5,796,718 A | 8/1998 | Caterisano | 370/217 |
| 5,835,493 A | 11/1998 | Magee et al. | 370/394 |
| 5,838,915 A | 11/1998 | Klausmeier et al. | 395/200.45 |
| 5,838,994 A | 11/1998 | Valizadeh | 395/876 |
| 5,903,545 A | 5/1999 | Sabourin et al. | 370/225 |
| 5,933,429 A | 8/1999 | Bubenik et al. | 370/392 |
| 6,011,780 A | 1/2000 | Vaman et al. | 370/237 |
| 6,192,483 B1 * | 2/2001 | Moiin et al. | 714/4 |
| 6,247,142 B1 * | 6/2001 | Wong et al. | 714/5 |
| 6,260,158 B1 * | 7/2001 | Purcell et al. | 714/10 |

* cited by examiner

*Primary Examiner*—Nadeem Iqbal
(74) *Attorney, Agent, or Firm*—Fletcher, Yoder & Van Someren

(57) ABSTRACT

A system and method for maintaining a communications within a computer system after a data transport failure across a first link. Fail-over capability is attained by re-establishing communications across a secondary link using different transport mechanisms. Between two Input/Output Processors (IOPs) within a computer system, such as a server, a series of data transactions therebetween are queued until transaction completion. Upon detection of a failure condition between the IOPs across the first link, the IOPs engage fail-over mechanisms to preserve uncompleted data transactions until communications are re-established across the secondary link.

20 Claims, 2 Drawing Sheets

SYSTEM AND METHOD FOR FAIL-OVER DATA TRANSPORT

This application is a continuation of application Ser. No. 09/075,623 filed May 11, 1998.

BACKGROUND OF THE INVENTION

1. Field of the Invention

The present invention relates generally to the handling of data transport failures and fail-over capability for data transfers within a computer system such as a server. More particularly, the present invention is directed to a system and method that establishes a secondary link for fail-over data transfer in the event of primary link failure. More particularly, also the system and method of the present invention are applicable for Input/Output Processors (IOPs) in an $I_2O$ (intelligent input/output) environment.

2. Description of Related Art

Computer systems have achieved wide usage in modern society. During operation, a computer system processes and stores data at a speed and at a level of accuracy many times that which can be performed manually. Successive generations of computer systems have permitted ever-increasing amounts of data to be processed at ever-increasing rates.

Computer systems are sometimes operated as stand-alone devices or connected together by way of network connections, typically together with a network server, to form a computer network. When networked together, files and other data stored or generated at one computer system can be readily transferred to another computer system.

A conventional computer system typically includes one or more CPUs (central processing units) capable of executing algorithms forming applications, and a computer main memory. Peripheral devices, both those embedded on a backplane of the computer system, or constructed to be separate therefrom, also typically form portions of a conventional computer system. Computer peripheral devices include, for instance, video graphics adapters, LAN (local area network) interfaces, SCSI (small computer system interface) adapters, and mass storage devices, such as disk drive assemblies.

A computer system further typically includes data buses which permit the communication of data between portions of the computer system. For instance, a host bus, a memory bus, at least one high-speed bus, a local peripheral expansion bus, and one or more additional peripheral buses form portions of a typical computer system.

A peripheral bus is formed, for instance, of a SCSI bus, an EISA (extension to industry standard architecture) bus, an ISA (industry standard architecture) bus, or a PCI (peripheral component interface) bus. The peripheral bus forms a communication path to and from a peripheral device connected thereto. The computer system CPU, or a plurality of CPUs in a multi-processor system, communicates with a computer peripheral device by way of a computer bus, such as one or more of the computer buses noted above. A computer peripheral, depending upon its data transfer speed requirements, is connected to an appropriate computer bus, typically by way of a bus bridge that detects required actions, arbitrates, and translates both data and addresses between the various buses.

A computer peripheral device forming a portion of a single computer system might well be supplied by a manufacturer other than the manufacturer of the computer CPU. If the computer system contains more than one peripheral device, the peripheral devices might also be supplied by different manufacturers. Furthermore, the computer system may be operable pursuant to any of several different operating systems. The various combinations of computer peripheral devices and computer operating systems of which a computer system might be formed quickly becomes quite large.

Software drivers are typically required for each computer peripheral device to effectuate its operation. A software driver must be tailored to be operable together with the operating system pursuant to which the computer system is operable. A computer peripheral device must, therefore, have associated therewith a software driver to be operable together with any of the several operating systems pursuant to which the computer system might be operable. A multiplicity of software drivers might have to be created for a single computer peripheral to ensure that a computer peripheral device is operable together with any of the different operating systems.

The complexity resulting from such a requirement has led to the development of an $I_2O$ (intelligent input/output) standard specification. The $I_2O$ standard specification sets forth, inter alia, standards for an I/O device driver architecture that is independent of both a specific peripheral device being controlled and the operating system of the computer system at which the device driver is to be installed.

In the $I_2O$ standard specification, the portion of the driver that is responsible for managing the peripheral device is logically separated from the specific implementation details for the operating system which is to be installed. Because of this, the part of the driver that manages the peripheral device becomes portable across different computer and operating systems. The $I_2O$ standard specification also generalizes the nature of communication between the host computer system and peripheral hardware, thus providing processor and bus technology independence.

Construction of computer systems compliant with the $I_2O$ standard specification facilitates formation of a computer system having component portions supplied by different suppliers while also assuring that the different component portions of the computer system shall be operable when connected together. Upgrading an existing computer system to be $I_2O$ aware assures that subsequent upgrading of the computer system shall be able to be effectuated simply.

One difficulty inherent in all computer systems is the handling of a variety of system faults and their recovery, also referred to as fault tolerance. The identification, control and isolation of such faults is especially important in current devices which employ Error Checking Correcting (ECC) memory, Redundant Arrays of Inexpensive Drives (RAID) and hot-swappable disk drives, and even hot-swappable power supplies. Within servers, fault tolerance techniques begin with an initial focus on memory and physical storage subsystems, and now includes various fail-over solutions. Current servers implement such fail-over solutions for storage subsystems and LAN-LAN routing.

It has been proposed that the $I_2O$ specification may be used to incorporate new levels of fail-over for I/O subsystems. One particular area of interest is the peer-to-peer and clustering capabilities of $I_2O$. Peer-to-peer technology allows two I/O Processors (IOPs) to communicate with each other independently of the host CPUs and the media connecting the two IOPs. Clustering extends the peer-to-peer concept outside of the physical system (or unit) defined by the $I_2O$ specification.

Problems arise, however, when a failure occurs across the media connecting two such IOPs, such as disconnection of a communications cable (minor) or a bus lock-up (severe). In non-I$_2$O systems, for example, each driver must have direct knowledge of every underlying transport and media, which since there are a myriad of transport and media types available, implies a lot of complex coding for each driver to handle various contingencies. In the current I$_2$O specification, for example, a fault, upon detection by a transport device, is reported to each device driver or application software, collectively referred to hereinafter as downloadable driver modules or DDMs, using a particular data service pathway. The respective DDMs then automatically close the connection with the remote IOP and lose all of the resources previously allocated by that DDM on that remote IOP. Furthermore, the DDMs, upon transport failure, must tear down their respective operating environments and completely rebuild them. Even if a redundant link is found, the entire buffer allocation and DDM-to-DDM setup must begin anew.

There is, therefore, a need for a computer system and method which minimizes the error handling needs of a device driver or application software, particularly in the event of a primary transport failure.

SUMMARY OF THE INVENTION

The present invention is directed to a system and method for maintaining communications within a computer system after a data transport failure across a first link. Fail-over capability is attained by re-establishing communications across a secondary link using different transport mechanisms. For example, between two Input/Output Processors (IOPs) within a computer system, such as a server, a series of data transactions therebetween are queued until transaction completion. Upon detection of a failure condition between the IOPs across the first link, the IOPs engage fail-over mechanisms therein to preserve uncompleted data transactions until communications are re-established across the secondary link.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Although the principles set forth in the present invention are applicable to a variety of computer architectures, for simplicity only one such architecture, I$_2$O, will be described in detail herein. It should therefore be understood to those skilled in the art that although the preferred embodiment of the present invention is an extension on the standardized I$_2$architecture, the present invention is also applicable in non-I$_2$O architectures.

Figure 1:
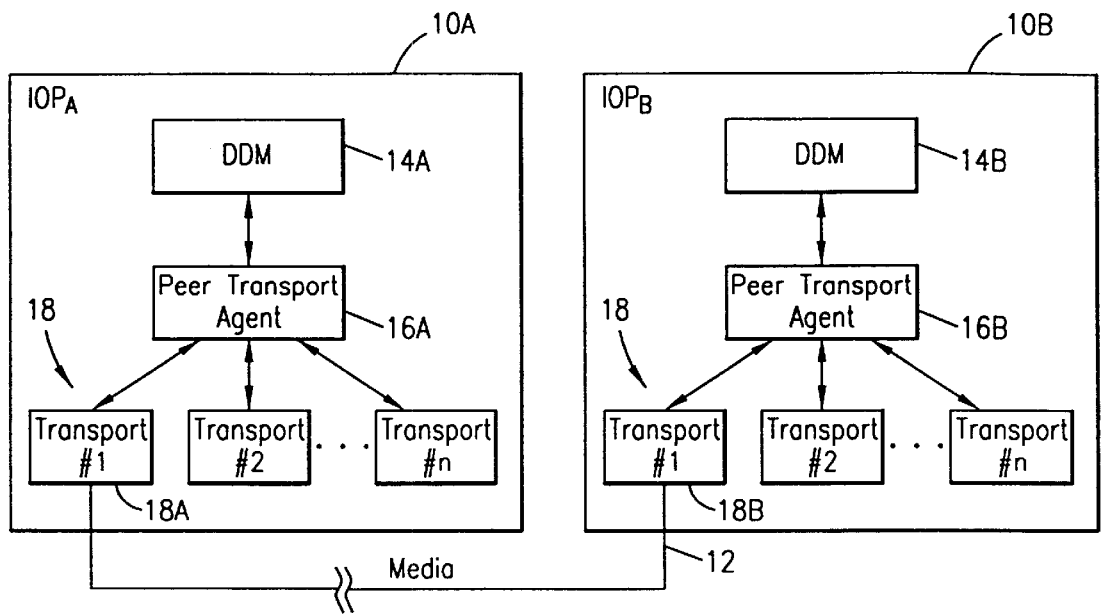
FIG. 1 depicts a portion of the system architecture for a conventional computer system, illustrating inter-processor communications across a primary media link.

Shown in FIG. 1 is a general illustration of some of the features of the aforementioned I$_2$O architecture, which abstracts the underlying transport mechanisms through the creation of a class of Application Program Interfaces (APIs), defining a set of common services for all transports. In particular, inter-processor communications are depicted in which a first IOP 10A is in communication with a second IOP 10B across a media link 12 therebetween. As further shown in FIG. 1, IOP 10A includes therein a first DDM (or I$_2$O Real Time Operating System) 14A, a first Peer Transport Agent (PTA) 16A in communication with the DDM 14A, and a first multiplicity of transports, generally designated in FIG. 1 by the reference numeral 18. Similarly, IOP 10B contains therein a second DDM 14B, a second PTA 16B and a second multiplicity of transports 18. As illustrated, IOP 10A communicates, via a first of said transports 18A, with IOP 10B via another of said transports 18B therein across media link 12.

It should be understood in the art that the aforementioned transports 18 are hardware devices and/or software applications operating at the transport layer, according to the International Standards Organization Operating Systems Interconnection model (ISO OSI). In particular, each transport 18 represents a specific protocol for transforming data across a given media. It should further be understood that multiple transports may exist for a single media, for example, in currently available network adaptors such as Transmission Control Protocol/Internet Protocol (TCP/IP), NetBIOS Extended User Interface (NetBEUI), ServerNet, Fibre Channel or a number of other communication networks.

It should be understood that in hot-pluggable environments, all communication paths between IOPs, such as IOPs 10A and 10B, must be quiesced before adaptor replacement. After all paths have been torn down, the failed adaptor is placed in reset and powered down. The respective hot-plug drivers in the host Operating System (OS) and on a given IOP work in conjunction to preserve the IOP's state information, e.g., the IOP's Target Identification (TID), an identifier for each device in an I$_2$O system. After replacement, the adaptor is powered up and taken out of reset. After the host OS' hot-plug driver and Peer OS Specific Module (OSM) reestablish DDM-to-DDM connectivity, e.g., between DDMs 14A and 14B in FIG. 1, the DDMs 14 must individually create new connections to each remote IOP, attach and claim the requisite remote DDMs and allocate any local and remote memory necessary. It should be understood, however, that although the state (TID) information may persist across boot cycles and hot-plug events, the memory-allocations do not. Without automatic fail-over protection to maintain resource allocations on remote IOPs, conventional computer apparatus and methods, whether non-I$_2$O or I$_2$O in nature, are inadequate to preserve the connection after a connection failure.

Figure 2:
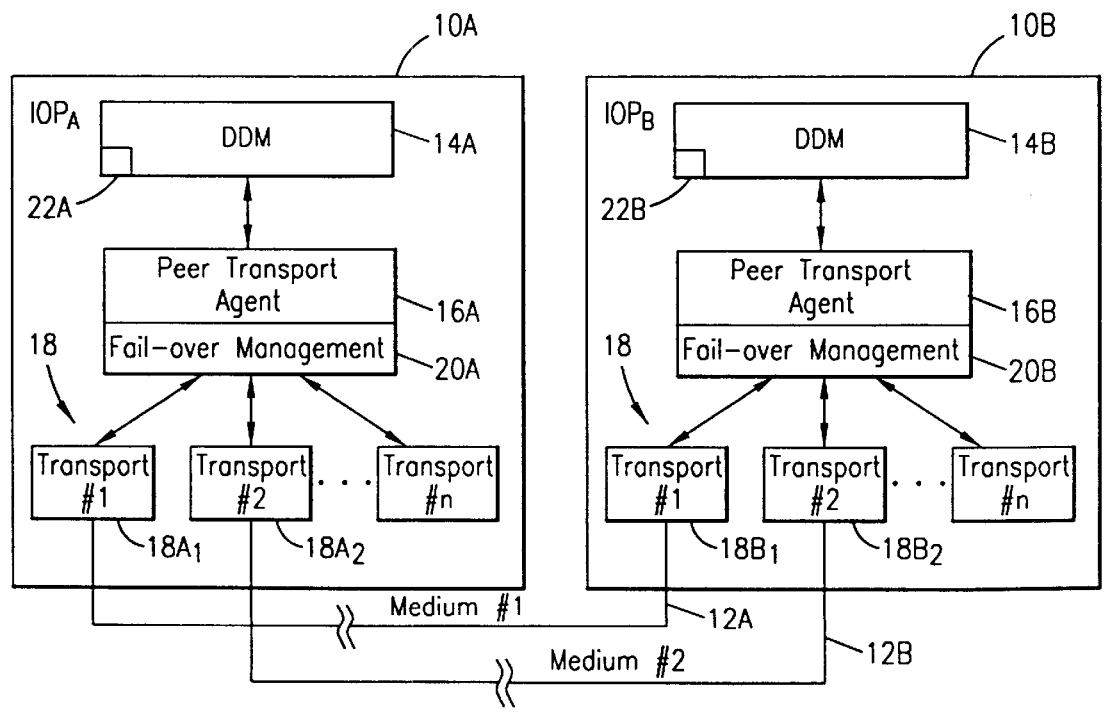
FIG. 2 illustrates the improved system architecture of the present invention, which incorporates a secondary media link in addition to the primary media link shown in FIG. 1.

As an extension to the aforementioned standard I$_2$O architecture depicted in FIG. 1, fail-over mechanisms can be implemented to isolate the respective DDM 14 from any underlying media/transport faults by implementing the transport fail-over principles of the present invention. With reference now to FIG. 2 of the Drawings, the Peer Transport Agents 16, described in connection with FIG. 1, of the present invention preferably incorporate Fail-Over Management mechanisms, generally designated by the reference numeral 20, therein. Also shown in FIG. 2 are two media links 12A and 12B. In particular, the IOPs 10A and 10B in FIG. 2 are actively connected to each other via transports 18A$_1$ and 18B$_1$ across media link 12A, for example, by a cable (network, serial, Fibre Channel, etc.) If that cable were somehow disabled or disconnected, however, the primary media link 12A would fail and IOPs 10A and 10B would, upon such disconnection and processor reset, reallocate any local and remote resources, such as storage space on respective memories 22A and 22B shown in FIG. 2.

In accordance with the strategy of the present invention, however, inter-DDM communication and resources are maintained after primary media link 12A failure by the use of the redundant, backup media link 12B, secondarily connecting the IOPs 10A and 10B via transports 18A$_2$ and 18B$_2$, respectively. With the redundant pathway connecting the DDMs 14A and 14B, the respective PTAs 16A and 16B would automatically switch over from the nonfunctional primary media link 12A to the redundant media link 12B without interrupting the operation of each IOP's 10 peer DDMs 14, thereby minimizing the impact of the link failure on the respective DDMs 14. In other words, no disconnection and subsequent reset and reallocation occurs. In a preferred embodiment of the present invention the PTAs 16 keep track of all peer requests/transactions and the associated memory allocation(s). Further details on the data management functionality of the aforementioned preferred embodiment for implementing the aforedescribed transport fail-over system and method are described hereinbelow.

When a DDM, e.g., DDM 14A in IOP 10A, issues a data service request, the request goes through the associated PTA 16A, which is responsible for tracking each DDM's 14 message, data delivery requests and associated status information. The PTA 16A preferably uses a portion of the IOP's 10A memory, e.g., memory 22A described hereinbefore in connection with DDM 14A, to store data regarding outstanding DDM requests and remote memory allocations.

When allocating remote memory, the PTA 16 forwards the aforementioned data service request through the pertinent transports 18, via media 12, to the indicated remote IOP. Preferably, the reply message contains a conventional scatter gather list (SGL) describing the remote buffers involved, e.g., for PTA 16A accessing the remote data in memory 22B. For each such remote memory allocation request, the PTA 16 stores a copy of the returned remote buffer identifier, e.g., remBufAllocID, and correlates the identifier with an access status indicator, along with the state (TID) information of the DDM 12 requesting the allocation. Boolean or other flag values may be employed for each DDM 14 to indicate normal access to memory 22, prohibited memory access due to transport failure, etc.

The data send requests from the DDMs 14 are preferably tracked by a data send service and the respective PTA 16 holds a list of all outstanding data send transactions, each identified by a DataSendID identifier. Upon successful completion of a given transaction, a data send completion handler removes that transaction from the outstanding list and passes completion status to the originating Data Delivery Service User (DDSU), i.e., the aforedescribed DDM 14.

Figure 3:
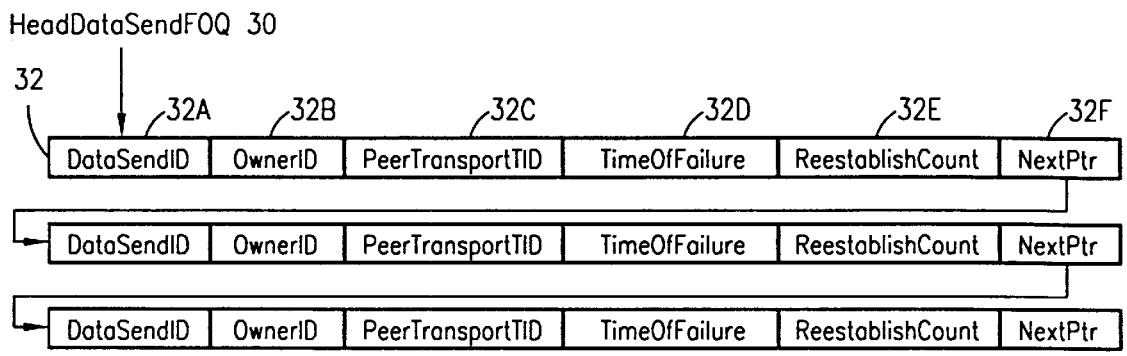
FIG. 3 illustrates a data send fail-over queue that may be used in the present invention.

If the data send operation fails, e.g., due to disconnection or other primary link failure, the transaction is then posted to the data send service's fail-over queue, e.g., DataSend-FOQ. In particular, if the pertinent transport 18 signals a loss of connectivity, all pending and new transactions to the particular remote IOP 10 are posted to the aforementioned DataSendFOQ, which is used by the PTA 16 during link re-establishment. A preferred data structure for the DataSendFoQ is illustrated in FIG. 3 in which a head pointer, HeadDataSendFOQ 30, points to a first field of a DataSend record 32, DataSendID 32A, which is the particular identifier or object handler for the data object/transaction. DataSend record 32 also includes an OwnerID field 32B which indicates the identifier (TID) of the initiating DDM 14, a PeerTransportTID field 32C which indicates the particular transport 18 used for data send service, a TimeOfFailure field 32D which includes a timestamp for the failure, a ReestablishmentCount field 32E which indicates the number of retries attempted, and a NextPtr field 32F which points to the start of another, next DataSend record 32 or contains a NULL to indicate the end of the linked list.

Data movement in the preferred embodiment of the present invention is a virtualized, Direct Memory Access (DMA) service where the data is moved between explicitly defined source and destination buffers. A data move service within the PTA 16 tracks all DDM 14 requests by maintaining a data structure for all outstanding transactions. As with the aforementioned data send service, when data move transactions successfully complete, they too are removed from the outstanding list and completion status is returned to the initiating DDSU, e.g., a DDM 14 or an I$_2$O Real Time Operating System (IRTOS).

Figure 4:
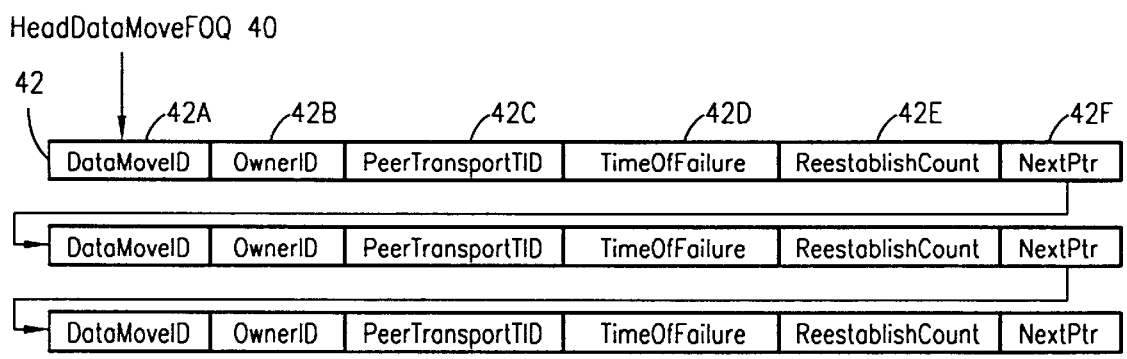
FIG. 4 illustrates a data move fail-over queue that may be used in the present invention.

If the data move operation fails, the transaction is then posted to the data move service's fail-over queue, e.g., DataMoveFOQ. If the pertinent peer transport 18 signals a loss of connectivity, all pending and new transactions to the pertinent remote IOP are posted to the DataSendFOQ, which is used by the PTA 16 during the link re-establishment process. The structure for the DataMoveFOQ is shown in FIG. 4, which is similar to the DataSendFOQ structure shown in FIG. 3. A HeadDataMoveFOQ pointer 40 points to a DataMoveID field 42A of the DataMove record 42. Fields 42B–F correspond to the fields 32B–F described in connection with FIG. 3.

Figure 5:
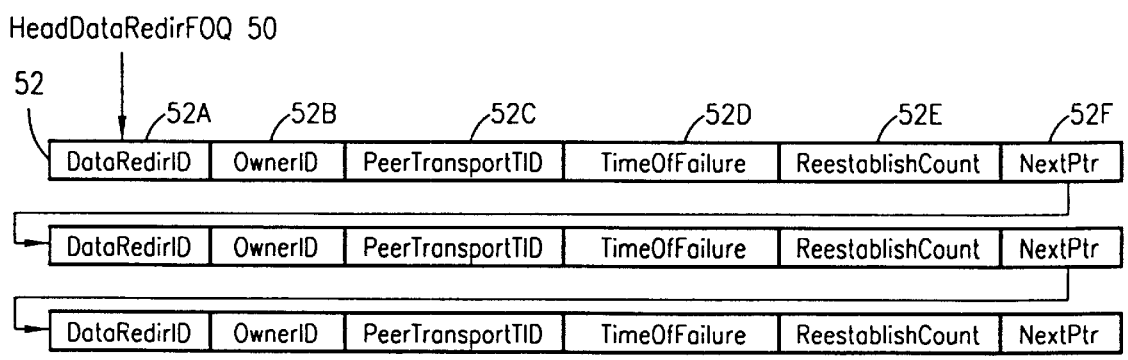
FIG. 5 illustrates a data redirect fail-over queue that may be used in the present invention.

A similar record data structure may be utilized to implement other functions, e.g., a data redirect fail-over queue, DataRedirFOQ, which employs a HeadDataRedirFOQ 50 and fields 52A–F of a DataRedirect record 52, as. illustrated in FIG. 5.

With reference again to FIG. 2, if data link connectivity is lost across the primary (active) transport mechanism, e.g., between transports 18A$_1$ and 18B$_1$ across media link 12A, both transports signal the connectivity status change to their associated PTAs, 16A and 16B, respectively, each of which updates its parameter tables and notifies the Peer OSM of the detection of transport failure. The following discussion describes various actions performed by the PTAs 16 upon receipt of a connectivity status change.

Upon loss of connectivity, a local PTA, e.g., PTA 16B, marks a portion of the memory 22B allocated therein for usage by a remote PTA, e.g., PTA 16A, as "suspended due to transport failure" by setting the access indicator for the corresponding remBufAllocID to "no access". Similarly, the PTA 16B also marks the portion of the memory 22A it allocated on the remote IOP 16A as "suspended due to transport failure".

All queued transactions from the PTA 16 and new transactions to the remote IOP are, upon connectivity loss, placed in the appropriate data service's fail-over queue (FOQ), as described above. Each PTA 16 sends a ptacancelxxx message to the failed transport(s) involved, e.g., PTA 16A to transport 18A, and PTA 16B to transport 18B, in order to clear all outstanding transactions. Once the connection with the remote IOP is reestablished, e.g., using the redundant, secondary media link 12B, the respective PTAs 16 use the information contained within each of the aforedescribed FOQs to synchronize the remote memory allocation and resubmit each of the failed transactions, queued within the respective FOQ data structures.

Each object placed in an FOQ is assigned a timestamp, which is placed within the aforementioned TimeOfFailure field 32D/42D/52D of FIGS. 3, 4 and 5, respectively. The PTA 16 uses the timestamp information to monitor and limit the time that a particular object waits for the IOP-IOP connection to be reestablished. A ptaMaxWaitReconnect or other such timeout parameter may be utilized by the PTA 16 to specify the maximum amount of time, e.g., in microseconds, that objects may wait in the FOQ.

If the connection is not reestablished within ptaMaxwaitReconnect microseconds, the PTA 16, e.g., of IOP IOB, removes all of the objects destined for the remote IOP 10A from the FOQ. The PTA 16 also returns all of the outstanding DDM 14 transactions with a status flag indicating the loss of peer service. The PTA 16 notifies the local DDM 14 that the connection with the remote IOP 10 has failed and is currently unrecoverable. The DDM 14 is then responsible for shutting down and freeing any allocated resources.

After receiving a connectivity status change event from a respective transport 18, the PTA 16 determines the actual status change. For example, if the transport 18 status changed to "active", the PTA 16 has the option of transferring all transactions from the fail-over transport which handled communications during the fail-over period to the original transport. This determination may be defined by a PTA restore parameter, e g., ptaRestoreoriginalTransport. If, however, the transport 18 status changed to "failed", the PTA 16 then attempts to find a new transport 18 that provides data link connectivity to the remote IOP 10. In the preferred embodiment of the present invention, it is the responsibility of the IOP 10 that first established connectivity to reestablish the IOP-IOP connection following a transport failure.

After connectivity failure, the PTA 16 scans, in a prioritized order, its list of available media links 12 and associated transports 18 to determine which transport 18 provides connectivity to the specified remote IOP 10. For example and with reference to FIG. 2, upon failure of media link 12A, PTA 16A scans the media available, media link 12B, and the transports associated therewith, transports 18A$_2$ and 18B$_2$ in IOPs 10A and 10B, respectively. If, however, no transport 18 provides data link connectivity to the specified IOP 10, the PTA 16 waits for the connection reestablishment period to timeout, ptaMaxWaitReconnect. Following timeout, the PTA 16 removes or purges all objects that cannot be delivered to the remote IOP 10 from the FOQ, and returns an unrecoverable transport error back to each failed object's originating DDM 14, or more generally the DDSU.

If there is a transport 18 that provides the requisite secondary data link connectivity to the specified IOP 10, the PTA 16 substitutes the new transport for the failed transport, e.g., PTA 16A switches from transport 18A$_1$ to new transport 18A$_2$ for the secondary media link 12B. However, before messaging can pass between two transports, e.g., 18A$_2$ and 18B$_2$, PTA 16 must issue a setup message to create a logical connection between the two transports by creating TID or other such identification aliases for each transport, as is understood in the art.

After establishment of the fail-over connection, the local PTA, e.g., PTA 16A, issues a release message (across the newly formed connection 12B) to the remote IOP 10B in order to completely sever the prior connection between the failed transports, i.e., between transports 18A$_1$ and 18B$_1$ across media link 12A. The PTA 16 then specifies the source TID as the alias TID to the local failed transport and specify the second TID as the alias TID to the remote failed transport. The PTA 16 then resynchronizes any remote memory allocations with the remote IOP.

It should be understood that the two PTAs 16, upon fail-over connection, must reclaim and synchronize their respective remote buffer allocation before the associated DDMs 14 use the transport data services. Reclaiming the prior remote buffer allocation, e.g., in the respective memories 22A and 22B or other storage within the IOPs 10, ensures that the DDMs 14 will not access memory that has been freed or reassigned due to the loss of connectivity.

With regard to synchronization after the primary connection has been lost, the local PTA 16A, for example, places all of the buffers it has allocated for the remote IOP 10B into a suspended state and sets a flag, remBufSynchronized, to FALSE. The remBufSynchronized flag indicates that the remote buffers, e.g., in memory 22B, are in an unknown state, and it is dangerous for the local PTA 16A to access the remote memory. PTA 16A has a similar flag defined for its own local buffers, localBufSynchronized, that is set to FALSE, also indicating a danger for the particular remote IOP 10B to access the local buffers, e.g., in memory 22A. The "danger" in accessing a remote buffer, prior to transaction reconstruction, is that the local DDM 14 does not know the current state or owner of the buffer. Accordingly, PTAs 16 preferably access the remote buffers only when both remBufSynchronized and localBufSynchronized are TRUE.

The local PTA 16A sends a message, ptaRemAllocSynch, to the remote PTA 16B to update the state of the remote IOP's 10B memory allocation (in memory 22A of the local IOP 10A). Within the message, the local PTA 16A includes the remote handle remBufAllocID for each buffer as well as the alias TID that previously owned the buffer. The remote IOP's 10B reply message preferably contains a list of buffer handles and associated status information. If the buffer status information indicates that the TID maintains ownership of the buffer, the PTA 16 changes the status of the buffer from "suspended due to transport failure" to "active". If, however, the buffer status information indicates that the local TID does not have access to the previously allocated buffer, e.g., the buffer having been freed due to a timeout or unexpected latency in reforming the IOP-IOP connection, the PTA 16 must notify the DDM 14 that the particular remBufAllocID is invalid. The DDM 14 then frees the indicated object.

After the local and remote buffer allocations have been resynchronized, the PTA 16 processes the transactions which were placed in the various Fail-Over Queues. The PTA 16 inspects each transaction's destination and fail-over timestamp. If the transaction has exceeded its allowable submission time, ptaMaxWaitReconnect, the transaction return status is set to "failed". The transaction is then returned to the originating DDSU. If the transaction has not exceeded its allowable submission time, however, then the PTA 16 identifies if there is still connectivity to the target IOP 10. If connectivity exists, the PTA 16 removes the transaction from the FOQ and sends it to the transport providing data delivery services to the target IOP 10.

If a connection does not exist with the target IOP 10, the transaction is placed back in the FOQ because the PTA 16 may still be trying to establish connectivity to the IOP 10. Eventually, connectivity will be gained and the transaction will be forwarded to the appropriate remote IOP, or the transaction will timeout and return with a failure status.

It should be understood that a variety of media may be used as the primary and secondary media links 12A and 12B, respectively, either alone or in combination. In particular, the media may include the aforementioned ServerNet and, Fibre Channel, as well as Ethernet, Personal Computer Interconnect (PCI) and related protocols providing a communication path between users. It should, of course, be understood that a reliable and better performing media should be selected as the primary media link 12A and a less-optimal media chosen as the secondary link 12B.

As set forth hereinabove, in preferred embodiments of the present invention transport fail-over mechanisms are applied in inter-IOP communications within Input/Output-intensive environments such as servers, particularly in an $I_2O$ system. It should nonetheless be understood that the principles of the present invention may find applicability in non-server, non-$I_2O$ systems as well. Accordingly, the scope of the present invention should not necessarily be limited by this description, but should instead be defined by the following claims.

What is claimed is:

1. A method for fail-over connection between a first and second input/output processing unit within a computer system, the method comprising the acts of:
   detecting a failure condition across a first communications link connecting the first and second input/output processing units, the failure condition interrupting submission of a plurality of transactions onto the first communications link;
   queuing, upon the failure condition detection, the plurality of transactions;
   selecting, upon the failure condition detection, a secondary communications link between the first and second input/output processing units within the computer system;
   establishing communications between the first and second input/output processing units across the secondary communications link; and
   submitting the plurality of queued transactions for forwarding across the secondary communications link.

2. The method according to claim 1, wherein the plurality of data transactions are queued in at least one linked list.

3. A method for fail-over connection between a first processing unit and a second processing unit within a computer system, the method comprising the acts of:
   queuing a plurality of transactions, the plurality of transactions for communication between the first processing unit and the second processing unit across a first communications link;
   detecting a failure condition interrupting communication of the plurality of transactions across the first communications link;
   establishing communication, after detection of the failure condition, between the first and second processing units across a second communications link connecting the first and second processing units, the second communications link for communicating the plurality of queued transactions; and
   if the act of establishing communication fails to occur within a given timeout period, purging the plurality of queued transactions.

4. A method for fail-over connection between a first processing unit and a second processing unit within a computer system, the method comprising the acts of:
   queuing a plurality of transactions for communication between the first processing unit and the second processing unit across a first communications link;
   detecting a failure condition interrupting communication of the plurality of transactions across the first communications link;
   selecting, upon the failure condition detection, a second communications link between the first and second processing units;
   establishing communication between the first and second processing units across the second communications link to communicate the plurality of queued transactions; and
   if the act of selecting the second communications link fails to occur within a given selection timeout period, then purging the plurality of queued transactions.

5. The method according to claim 1, comprising the act of:
   after detecting the failure condition, setting a memory status flag, the flag corresponding to the status of a memory allocation on at least one of the first and second processing units.

6. The method according to claim 1, wherein the computer system comprises a server.

7. A computer system comprising:
   a first input/output processing unit;
   a second input/output processing unit, the first and second processing units communicating across a first communications link therebetween; and
   fail-over logic to maintain communications between the first and second input/output processing units after detecting a failure condition across the first communication link, the fail-over logic comprising:
      a data transaction queue to queue, upon detection of the failure condition, a plurality of transactions for communication between the first and second input/output processing units,
   the fail-over logic configured to:
      establish communication between the first and second input/output processing units across a secondary communications link, and
      submit the plurality of queued transactions for forwarding across the secondary communications link.

8. The computer system according to claim 7, wherein the data transaction queue comprises a plurality of linked lists.

9. A computer system comprising:
   a first processing unit;
   a second processing unit, the first and second processing units communicating across a first communications link established therebetween;
   fail-over logic to maintain communications between the first and second input/output processing units after detecting a failure condition across the first communication link, the fail-over logic configured to establish communication between the first and second input/output processing units across a secondary communications link; and
   a data transaction queue to store a plurality of data transactions for communication between the first and second processing units, wherein, upon the failure condition detection, the plurality of data transactions are stored within the data transaction queue until the fail-over logic establishes communication across the secondary communications link;

wherein, if the fail-over logic does not establish communication across the secondary communications link before expiration of a timeout period, the data transaction queue is purged.

10. The method according to claim 1, wherein the first communications link comprises one of Personal Computer Interconnect, ServerNet, Fibre Channel, and Ethernet, and wherein the second communications link comprises one of Personal Computer Interconnect, ServerNet, Fibre Channel, and Ethernet.

11. The computer system according to claim 7, the first communications link comprises one of Personal Computer Interconnect, ServerNet, Fibre Channel, and Ethernet, and wherein the second communications link comprises one of Personal Computer Interconnect, ServerNet, Fibre Channel, and Ethernet.

12. The method according to claim 4, wherein the first processing unit comprises an $I_2O$-compliant processing unit, and wherein the second processing unit comprises an $I_2O$-compliant processing unit.

13. The computer system according to claim 9, wherein the first processing unit comprises an $I_2O$-compliant processing unit, and wherein the second processing unit comprises an $I_2O$-compliant processing unit.

14. The method according to claim 1, wherein the act of queuing the plurality of transactions is performed upon detection of the failure condition.

15. The method according to claim 3, comprising the act of selecting, upon detection of the failure condition, the secondary communications link.

16. The method according to claim 15, comprising the acts of:

after the act of selecting the second communications link, determining whether a particular transaction of the plurality of transactions has been queued for longer than a given timeout period; and if not, submitting the particular transaction for communication across the second communications link.

17. The method according to claim 16, comprising the acts of determining whether communications have been established; and if not, requeuing the particular transaction.

18. The method according to claim 16, comprising the acts of:

if the particular transaction has been queued for longer than the given timeout period, purging the particular transaction.

19. The method according to claim 1, wherein the secondary communications link is inactive until communications are established across the secondary communications link.

20. The computer system according to claim 7, wherein the secondary communications link is inactive until communications are established across the secondary communications link.

* * * * *